US011900635B2

(12) United States Patent
Gilad et al.

(10) Patent No.: US 11,900,635 B2
(45) Date of Patent: Feb. 13, 2024

(54) ORGANIC CAMERA-POSE MAPPING

(71) Applicants: Oran Gilad, Herzliya Pituach (IL); Samuel Chenillo, New York, NY (US); Oren Steinfeld, Tel Aviv (IL)

(72) Inventors: Oran Gilad, Herzliya Pituach (IL); Samuel Chenillo, New York, NY (US); Oren Steinfeld, Tel Aviv (IL)

( * ) Notice: Subject to any disclaimer, the term of this patent is extended or adjusted under 35 U.S.C. 154(b) by 0 days.

(21) Appl. No.: 18/317,283

(22) Filed: May 15, 2023

(65) Prior Publication Data

US 2023/0368425 A1    Nov. 16, 2023

Related U.S. Application Data

(60) Provisional application No. 63/342,133, filed on May 15, 2022.

(51) Int. Cl.
*G06T 7/80* (2017.01)
*G06T 3/00* (2006.01)

(52) U.S. Cl.
CPC ............. *G06T 7/80* (2017.01); *G06T 3/0006* (2013.01); *G06T 2207/10016* (2013.01); *G06T 2207/30244* (2013.01)

(58) Field of Classification Search
CPC ...................... G06T 7/80; G06T 3/0006; G06T 2207/10016; G06T 2207/30244
See application file for complete search history.

(56) References Cited

U.S. PATENT DOCUMENTS

| | | | |
|---|---|---|---|
| 9,911,213 B2 | 6/2018 | Gormish | |
| 11,557,019 B1 | 1/2023 | Gonzales | |
| 2021/0319587 A1* | 10/2021 | Sha | H04N 21/854 |

OTHER PUBLICATIONS

Skinner, Patrick, and Stefanie Zollmann. "Localisation for augmented reality at sport events." 2019 International Conference on Image and Vision Computing New Zealand (IVCNZ). IEEE, 2019. (Year: 2019).*

* cited by examiner

*Primary Examiner* — Vu Le
*Assistant Examiner* — Tracy Mangialaschi
(74) *Attorney, Agent, or Firm* — RosserIP, LLC; Roy Rosser

(57) ABSTRACT

A system and method of organically generating a camera-pose map is disclosed. A target image is obtained of a location deemed suitable for augmenting with a virtual augmentation or graphic. An initial camera-pose map is created having a limited number of calibrated camera-pose images having calculated camera-pose locations and homographies to the target image. Then, during the event, the system automatically obtains current images of the event venue and determines homographies to the nearest calibration camera-pose image in the camera-pose map. The separation in camera-pose space between the current images and the camera-pose images are calculated. If this separation is less than a predetermined threshold, that current image is fully calibrated and added to the camera-pose map, thereby growing the map organically.

12 Claims, 4 Drawing Sheets

100

200

300

400

$$\begin{bmatrix} X' \\ Y' \\ 1 \end{bmatrix} = \begin{bmatrix} (0,0) & (0,1) & (0,2) \\ (1,0) & (1,1) & (1,2) \\ (2,0) & (2,1) & 1 \end{bmatrix} \begin{bmatrix} X \\ Y \\ 1 \end{bmatrix}$$

$$\begin{bmatrix} X' \\ Y' \\ 1 \end{bmatrix} = \begin{bmatrix} Sx & 0 & Tx \\ 0 & Sy & Ty \\ 0 & 0 & 1 \end{bmatrix} \begin{bmatrix} X \\ Y \\ 1 \end{bmatrix}$$

ORGANIC CAMERA-POSE MAPPING

CROSS-REFERENCE TO RELATED APPLICATIONS

This is a non-provisional patent application of provision patent application U.S. 63/342,133 entitled "Organic Camera-Pose Mapping" that was filed on 15 May 2022, the contents of which are hereby incorporated by reference into the current application in their entirety.

BACKGROUND OF THE INVENTION

(1) Field of the Invention

The invention relates to video and computer graphics, and more particularly to methods of obtaining camera-pose information for the purpose of inserting graphics into video streams with the correct position, scale, orientation, and relative motion relative to photographed objects in the video stream.

(2) Description of Related

Inserting virtual augmentations or images in so that they blend seamlessly with streams of video images obtained from events occurring in venues is an important part of modern television and video broadcasting and live streaming, as evidenced by the popularity of augmentations such as, but not limited to, the virtual $1^{st}$ down line in broadcasting of football in the United States.

To make the virtual augmentations appear as if they are a part of the original footage and actually at the event location, video match moving, or motion tracking is used. This is a technology which may involve tracking points within the video footage that may be known to be fixed in space, and analyzing these points to determine how a current image may be transformed to match other images in the video footage. Once that transformation, or homography, has been determined, the information may be used to place graphic augmentations into the scene, making the graphics appear as though they are part of the original footage.

In preparing to augment a stream of video images of an event, it is typically necessary to perform a calibration of the images obtained by a camera being used at an event venue in order to obtain a camera-pose map of the venue, i.e., a map of how the venue appears in images taken with a camera when the camera is in a particular setting such as, but not limited to, the pan, tilt, focus, zoom and translation of the camera. This typically involves the event camera being used to record a series of panoramic sweeps of the venue at a series of zoom levels. Once such a set of panoramic views, or a camera-pose map of the venue, is available, an incoming image may be matched to the panoramic views with sub-pixel accuracy. An accurate calculation may then be made of how to transform a virtual augmentation so as to realistically merge it with the incoming images, i.e., to make it appears to be a part of the event venue by inserting it in the incoming image at the correct location with the correct pose. However, acquiring such a set of detailed panoramic views is typically very time consuming, often requiring between 30 minutes and an hour to perform.

What is needed is a method of obtaining a camera-pose map of an event venue that requires a minimum of pre-event calibration or effort.

The relevant prior art includes:

U.S. Pat. No. 9,911,213 to Michael Gormish that issued on Mar. 6, 2018 entitled "Panoramic Image Stitching Using Objects" that describes a system and method that determines a seam between pairs of adjacent images for panoramic image stitching. The method includes receiving a sequence of images, determining a pair of adjacent images in the sequence of images, matching one or more objects corresponding to a same object identifier in the pair of adjacent images, determining a seam in an overlap region between the pair of adjacent images and determining a portion of pixels from each image of the pair of adjacent images to represent in a stitched panoramic image based on the seam.

U.S. Pat. No. 11,557,019 to Antonio Gonzales et al. that issued on Jan. 17, 2023 entitled "Homography Generation for Image Registration In Inlier-poor Domains"" that describes a method for efficient image registration between two images in the presence of inlier-poor domains includes receiving a set of candidate correspondences between the two images. An approximate homography between the two images is generated based upon a first correspondence in the correspondences. The set of candidate correspondences is filtered to identify inlier correspondences based upon the approximate homography. A candidate homography is computed based upon the inlier correspondences. The candidate homography can be selected as a final homography between the two images based upon a support of the candidate homography against the set of candidate correspondences. An image registration is performed between the two images based upon the candidate homography being selected as the final homography.

Various implementations are known in the art, but fail to address all of the problems solved by the invention described herein. Various embodiments of this invention are illustrated in the accompanying drawings and will be described in more detail herein below.

BRIEF SUMMARY OF THE INVENTION

An inventive system and method of organically generating a camera-pose map is disclosed.

In a preferred embodiment, an operator may designate a target location that is an area deemed suitable for augmenting with a virtual augmentation. Using a digital video camera located at a fixed location at an event venue, the operator may obtain a target image that includes the target location. The operator may then use the camera and a programmable digital computer to which it is functionally connected to obtain and calibrate at least one calibrated camera-pose image. The calibrated camera-pose image may then have a calculated camera-pose location and a calculated homography to the target image, and is the first of a set of calibrated camera-pose images that may constitute the camera-pose map of the stadium.

The computer may be programmed to automatically perform further functions including obtaining a current image of the event venue as an event occurs. This may be accomplished using the fixed camera for which the camera-pose map is being developed. The system may be programmed to then automatically determine an homography of the current image to one of the calibrated camera-pose images. It may do this by first selecting a camera-pose image having a camera-pose location closest to an estimated camera-pose location of the current image. Once an homography is established, the system may then calculate an actual camera-pose location of the current image, and a distance in camera-pose space between it and the camera-pose image it is closest to. If this distance in camera-pose space is less than a predetermined threshold, the current image may be designated as a new calibrated camera-pose image, and a part of the camera-pose map. In this manner, the camera-pose map may be grown organically.

The predetermined threshold may, for instance, be some fraction of a distance in camera-pose space between an image taken when the camera is panned to an extreme right pan position with medium zoom, and a camera-pose image when the camera is panned to an extreme left pan position with medium zoom. The fraction may, for instance, be, but is not limited to, $\frac{1}{100}^{th}$ of that distance.

Once the homography to a calibration image has been obtained, the system may use the transitive nature of homographies to then obtain an augmentation homography, i.e., the transform required to place and correctly position a virtual augmentation at the target location. This augmentation homography may then be used to augment the current image.

When an event is being filmed, the estimated camera-pose location of a current image may, for instance, be assumed to be the camera pose location of an immediately preceding current image.

Therefore, the present invention succeeds in conferring the following, and others not mentioned, desirable and useful benefits and objectives.

It is an object of the present invention to provide a system and method that minimizes the time and effort required to calibrate images taken with an event camera at an event venue.

It is another object of the present invention to provide a system and method that enables a camera-pose map to be grown organically during the filming of an event.

It is a further object of the present invention to provide a system and method that enables rapid, systematic search through candidate calibration images.

BRIEF DESCRIPTION OF THE SEVERAL VIEWS OF THE DRAWINGS

FIG. 5 B shows the camera-pose impact of selected elements of an homography matrix.

DETAILED DESCRIPTION OF THE INVENTION

Figure 1:
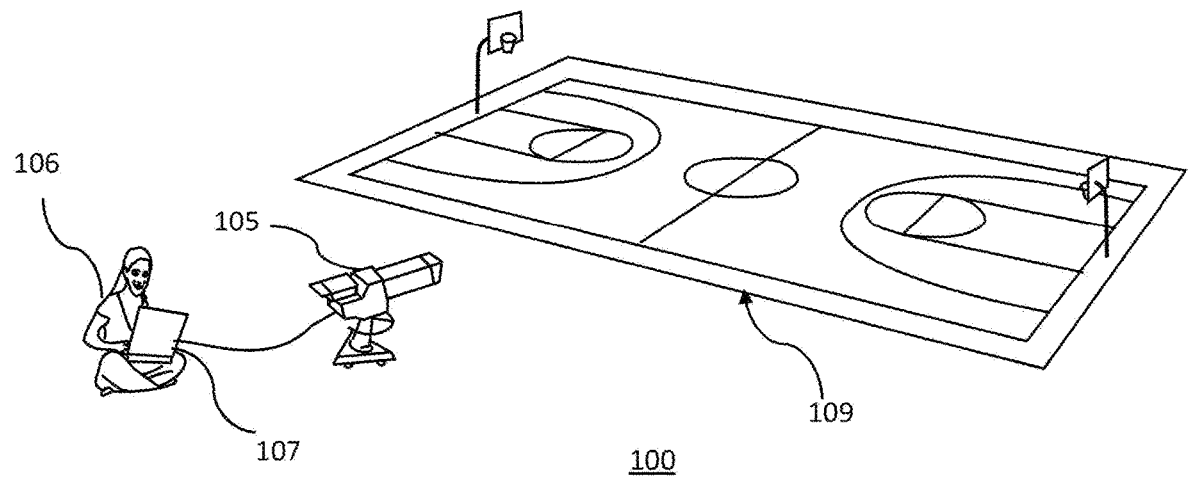
FIG. 1 shows a schematic representation of a camera being used to record or broadcast an event being held in an event venue.

The preferred embodiments of the present invention will now be described with reference to the drawings. Identical elements in the various figures are identified, in so far as possible, with the same reference numerals. The embodiments that are described in detail are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows a schematic representation 100 of a camera 105 being used to record or broadcast an event being held in an event venue 109.

The camera 105 may, for instance, be a broadcast quality digital video camera at a fixed location in an event venue. The camera may be being used to obtain images, or footage, of an event such as, but not limited to, a basketball game or an ice hockey match taking place in an event venue such as, but not limited to, a stadium or an ice rink.

The camera may be functionally connected to a programmable digital computer 107 that may be under the control of an operator 106. As detailed below, the operator may use the computer and camera to perform functions such as, but not limited to, obtaining a target image having a target location for the placement of a virtual augmentation or image.

Figure 2:
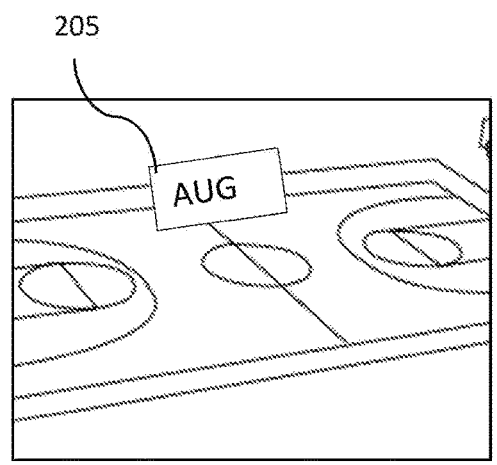
FIG. 2 shows a schematic representation of a target image.

FIG. 2 shows a schematic representation of a target image 200. The target image may have a target location 205 that the operator may have determined to be a suitable location for the placement of a virtual augmentation or image.

Figure 3:
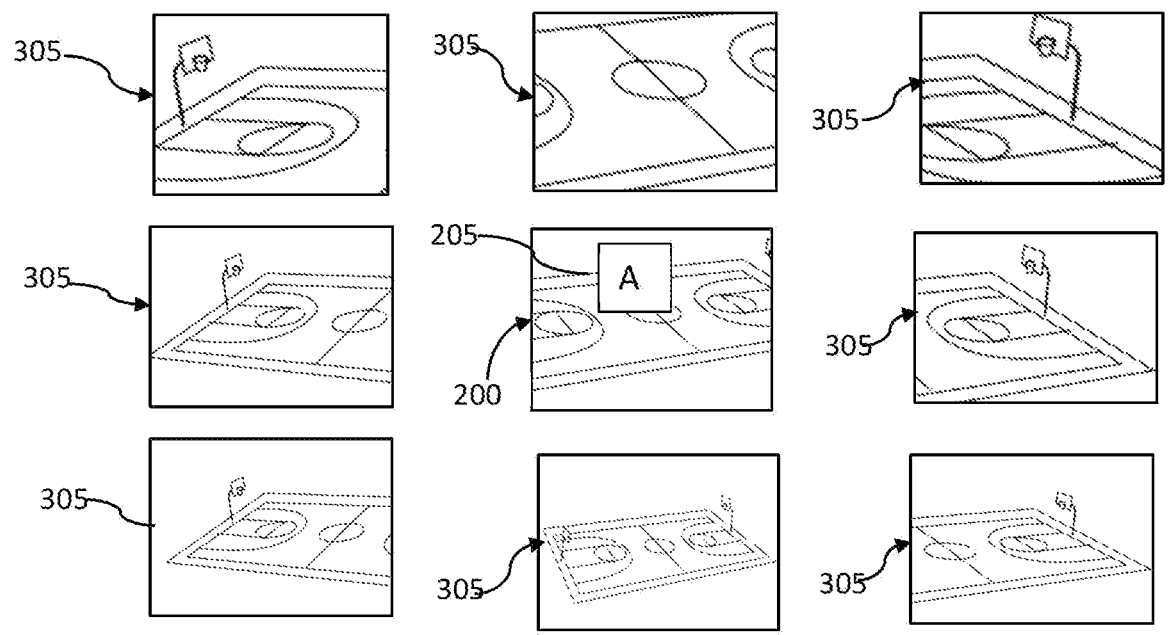
FIG. 3 shows a schematic representation of a set of calibration images or camera-pose map.

FIG. 3 shows a schematic representation of a set of calibration images or camera-pose map 300.

The images may be digital video images taken by a digital video camera that may be used to obtain video footage of an event occurring in an event venue. The number of initial calibration images 305 in the camera-pose map may be small, preferably less than ten, and may, for instance, be images taken with the camera centered, panned left and panned right, each at three zoom locations, i.e., medium, zoomed in and zoomed out.

The location image 200 may be an image that may be used by an operator to indicate where an augmentation graphic 307 may be placed. The operator may, for instance, indicate the location and pose of the augmentation graphic, i.e., its size and orientation with respect to the event venue. The augmentation graphic 205 may be computer generated and may be a still image, a video, a 3D graphic, an animation, or some combination thereof.

Figure 4:
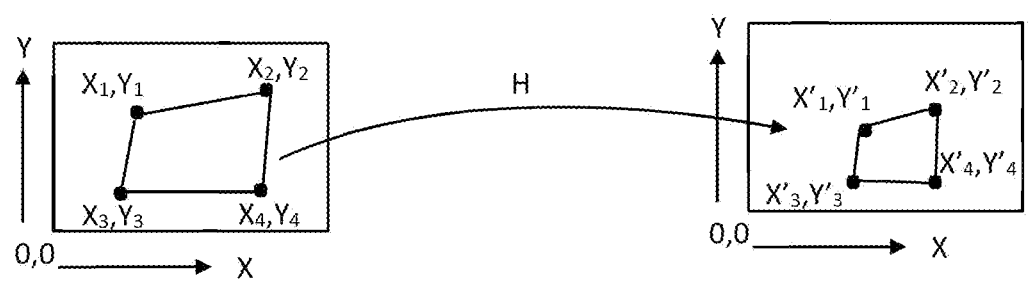
FIG. 4 shows a schematic representation of an homography transforming a location of a set of four points in a first image into a second image.

FIG. 4 shows a schematic representation 400 of an homography transforming a location of a set of four points in a first image into a second image.

As shown in FIG. 4, four points are located at a first set of positions in a first image on the left. The points are defined by their x and y coordinates. The second image, on the right, now shows the same four points but now located at different positions in the image. The points positions are now indicated by their x', y' coordinates.

The arrow labeled H is intended to indicate an homography transform that maps the x, y position of the points in the first image to the x', y' positions in the second image.

FIG. 5A shows a general homography matrix.

The homography matrix shown in FIG. 5A has eight degrees of freedom. Element (0,0) corresponds to scaling along the x axis; element (1,1) corresponds to scaling along the y axis; element (0,2) corresponds to translation along the x axis; element (1,2) corresponds to translation along the y axis; elements (1,0) and (0,1) corresponds to rotation of the image; and elements (2,0) and (2,1) correspond to keystone distortions of the image.

Figures 5, 6:
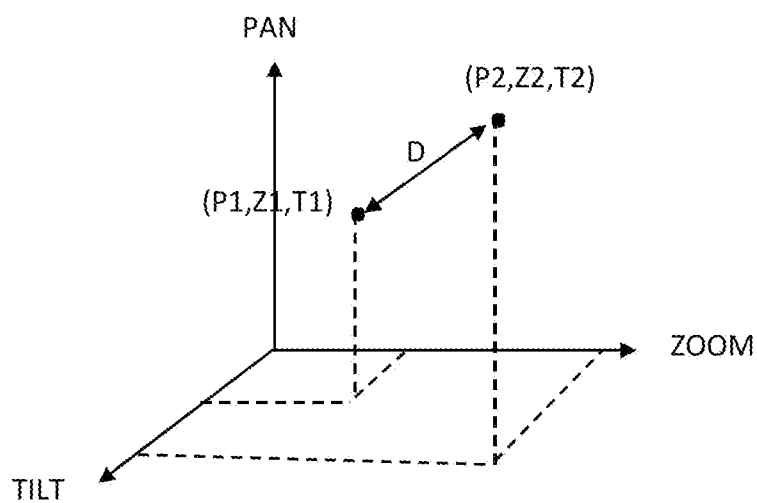
FIG. 5 A shows a general homography matrix.
FIG. 6 shows an exemplary camera pose coordinate system.

FIG. 5 B shows the camera-pose impact of selected elements of an homography matrix.

The element marked Sx corresponds to scaling along the x-axis; the element marked Sy corresponds to scaling along the y-axis; the element marked Tx corresponds to translation along the x-axis; and the element marked Ty corresponds to translation along the y-axis. When confined to the six degrees of freedom of translation, rotation and scaling, each with respect to two axis, the homography transform is essentially equivalent to an affine transform.

FIG. 6 shows an exemplary camera pose coordinate system.

As shown in FIG. 6, a coordinate system may be constructed having multiple, orthogonal axes each representing a function or state of a camera. In this instance the three axes are shown as the pan, the tilt, and the zoom status of the camera when an image is recorded. One of ordinary skill in the art may appreciate that the number of axes in such a coordinate system may be extended to include camera parameters such as, but not limited to, focus, rotation and translation.

A position of an image in camera pose space, i.e., the images camera pose location, may therefore be determined by from the homography parameters when the image is obtained.

As shown in FIG. 3, there are two camera pose locations, one having coordinates P1, Z1, T1 and the second P2, Z2, T2. The distance between these two camera-pose locations may be the Euclidian distance between them, i.e., the distance D as given by equation 1.

$$D=\mathrm{Sqrt}((P2-P1)^2+(Z2-Z1)^2+(T2-T1)^2) \quad (1)$$

where D represents the distance, P2 represents the pan component of the current image in camera-pose space, P1 represents the pan component of the camera-pose image in camera-pose space, Z2 represents the zoom component of the current image in camera-pose space, Z1 represents the zoom component of the camera-pose image in camera-pose space, T2 represents the translation component of the current image in camera-pose space, and T1 represents the translation component of the camera-pose image in camera-pose space.

Figure 7:
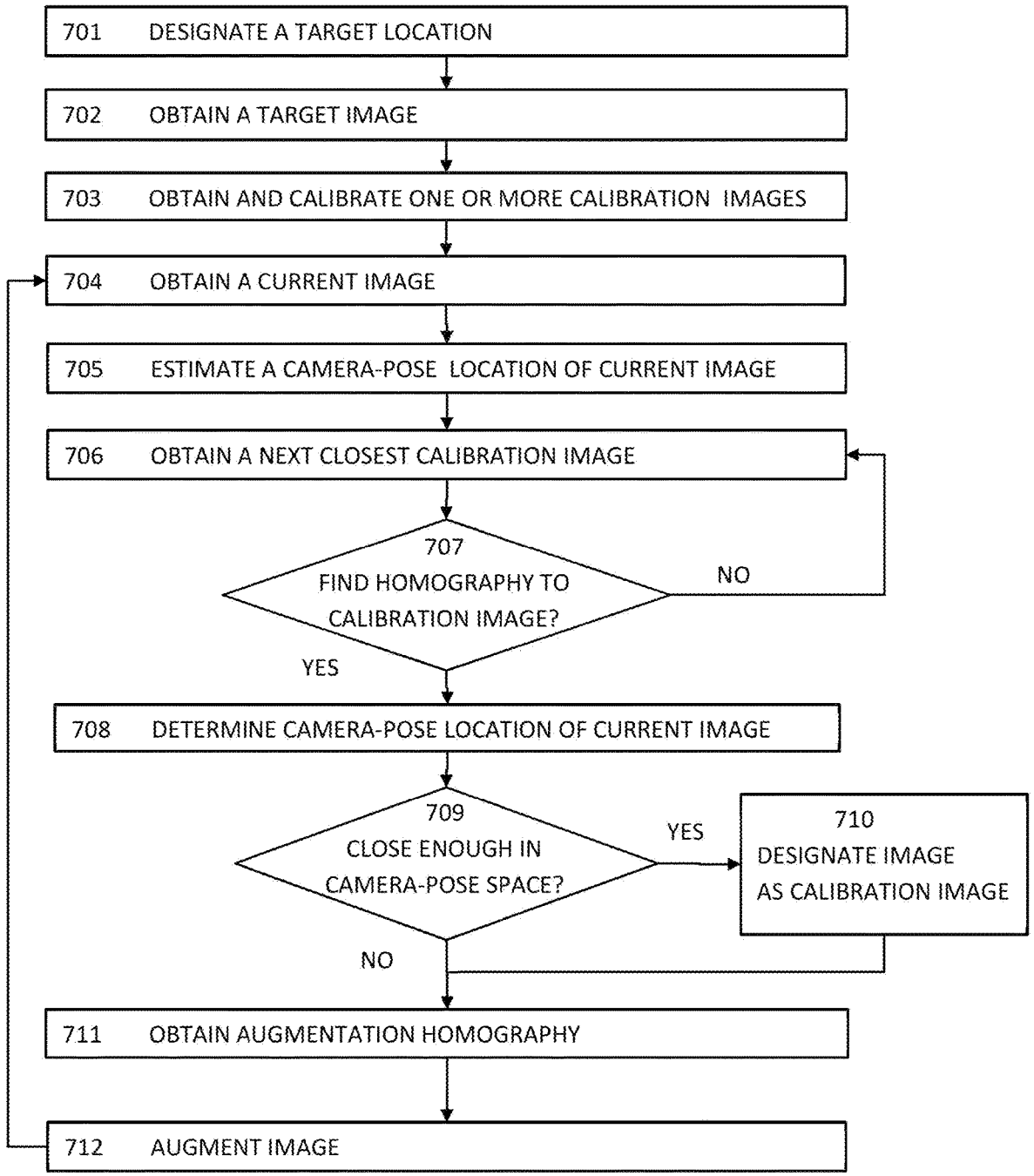
FIG. 7 is a flow diagram showing representative steps in implementing one embodiment of the system and method of organic camera-pose mapping of the present invention.

FIG. 7 is a flow diagram showing representative steps in implementing one embodiment of the system and method of organic camera-pose mapping of the present invention.

In Step 701 "DESIGNATE A TARGET LOCATION" an operator may designate a target location that may be deemed a suitable location of the insertion of a virtual augmentation or graphic.

In Step 702 "OBTAIN A TARGET IMAGE" the operator may obtain an image of the event venue that includes the designated target location. This may, for instance, be accomplished using the digital camera that may be at a fixed location within the event venue. Images taken with the camera may be recorded and processed by a suitably programmed digital computer that may be functionally connected to it.

In Step "OBTAIN AND CALIBRATE ONE OR MORE CALIBRATION IMAGES" a small number of discrete images representative of the event venue may be obtained and calibrated to form the initial camera-pose map. The images may be digital images obtained using the camera to be used to obtain images or footage of an event to be staged in the event venue. In a preferred embodiment, the number of images in the initial camera-pose map may be limited to being equal to or less than ten. These images may, for instance, be images of the event area with the camera centered, panned left and panned right, each at multiple zoom setting such as a close zoom, a medium zoom and a long zoom. These initial calibration images in the camera-pose map may be spread out so that in their entirety they provide a reasonable coverage of the event venue as may be seen by the camera during the staging of an event. These initial calibration images may be obtained by an operator within a matter of minutes thereby facilitating rapid preparation of the camera for use in virtual augmentation in subsequent images obtained using the same camera.

These initial images may be calibrated in that their homography to the target image and to one another may be calculated as well as their location within camera-pose space.

A common method for obtaining an homography between two images is a technique called "direct linear transformation" (DLT). This method involves finding a set of corresponding points in both images, and then solving a set of linear equations to determine the homography matrix that maps one set of points to the other. The DLT method requires at least 4 matching points between the images. These points may, for instance, be obtained automatically using feature matching algorithms such as, but not limited to, the Harris Corner Detector. This may operate by computing the "corner response" function for each pixel in an image, i.e., by measuring how much the image would change if it were shifted in any direction. Corners are identified as pixels with a high corner response, i.e., pixels have large local gradients.

To obtain an homography between two images, the system may automatically identify a set of corresponding points om each of the images. A set of linear equations in terms of the homography matrix described above may then be set up between the points. This set of linear equations may then be solved using well-known mathematical techniques such as, but not limited to, least squares or singular value decomposition. Once the homography matrix is obtained, it may be applied to all pixels of a first image to warp it into the same coordinate system as a second image.

Multiple sets of points, typically on the order of a hundred sets, may be used to estimate the homography. Each of the homographies obtained with these sets may contain errors. A consensus homography for the two images may be obtained using well-known methods such as, but not limited to, Random Sample Consensus (RANSAC). This may for instance involve selecting a random subset of data points (called the "inliers") and fitting an homography to these points. Then, the remaining data points (called "outliers") may be tested against the fitted homography to determine how many of these points are consistent with the homography within a certain predetermined threshold or tolerance. If the number of these exceeds the threshold, the model is considered a good fit for the data. Otherwise, a new random sample may be selected and the process repeated until a satisfactory model is found.

The camera-pose location may, for instance, be obtained from the homography matrices of the images. If, for instance, the target image is selected to be at the point (0,0,0) of a three axes camera pose coordinate system based on, for instance, zoom, pan, and tilt, then the camera pose location of any other image may be read off the augmentation homography, i.e., the homography of that image with respect to the target image. The pan value, i.e., the translation along the y-axis may be the (1,2) element of the matrix, the zoom value may be either or both of the (0,0) and the (1,1) element, and the tilt value may be the (0,2) element.

In Step "OBTAIN A CURRENT IMAGE" a current, or live image, of an event occurring in the event venue may be obtained using the digital video camera.

In Step 705 "ESTIMATE A CAMERA-POSE LOCATION OF CURRENT IMAGE" an estimate may be made of the location in camera-pose space of the current image. The estimated camera-pose location of the current image may, for instance, be the camera pose location of an immediately preceding current image.

In Step 706 "OBTAIN A NEXT CLOSEST CALIBRATION IMAGE" the system may search the existing camera-pose map for the calibration image that may be closest in camera-pose space to the estimated camera-pose location of the current image.

In Step 707 "FIND HOMOGRAPHY TO CALIBRATION IMAGE'?" the system may attempt to find an homography to the calibration image identified as being the closed in camera-pose location to the current image. The homography may be obtained, or attempted to be obtained, using the methods detailed above. If no satisfactory homography is obtained, the system may revert back to Step 706, and obtain the calibration image in the camera-pose map that is next closest to the estimated camera-pose location of the current image. This process may be repeated until all calibration images are exhausted, in which case it may be assumed that the system is receiving images from a different camera and the system move on to obtaining the next current image. Alternatively, the system may move on to obtaining a next current image after a predetermined number of next closest calibration images have been used. This number may depend on the computing power and memory of the computer being used to do the processing and may be limited to a number such as, but not limited to, 100.

When in Step 707, a satisfactory homography between the current image and the calibration image is obtained, the system may then move on Step 708 "DETERMINE CAMERA-POSE LOCATION OF CURRENT IMAGE". In this step, the actual camera-pose location of the current image may be calculated from the homography using the methods described above.

Having determined the actual camera-pose location of the current image, the system may move on to Step 709 "CLOSE ENOUGH IN CAMERA-POSE SPACE'?" the system may determine the separation in camera-space between the current image and the calibration image it now has an homography to. That distance may be determined using the method described above. If that distance is less than a predetermined threshold, the system may move on to Step 710 "DESIGNATE IMAGE AS CALIBRATION IMAGE" in which the current image may be designated as a calibration image and added to the camera-pose map of the camera, thereby growing the camera-pose map organically as the coverage of the event continues.

The predetermined threshold may, for instance, be some fraction of a distance in camera-pose space between an image taken when the camera is panned to an extreme right pan position with medium zoom, and a camera-pose image when the camera is panned to an extreme left pan position with medium zoom. The fraction may, for instance, be, but is not limited to, 1/100th of that distance.

The system may then move on to Step 711 "OBTAIN AUGMENTATION HOMOGRAPHY". The augmentation homography may, for instance, be the homography between the current image and the target image, i.e., the transform required to place and correctly position a virtual augmentation in the current image so that it appears to be located at the target location. This may be obtained using the transitive properties of homographies. The augmentation homography may, for instance, be the matrix combination of the homography of the current image to the calibration image and the calibration image's augmentation homography.

The system may now progress to Step 712 "AUGMENT IMAGE" in which the current image augmentation homography may be used to correctly position a virtual augmentation in the current image so that it appears to be located at the target location.

The system may then revert back to Step 704 and obtain the next current image from the event camera.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A method of organically generating a camera-pose map, comprising:
    obtaining a target image of an event venue taken immediately prior to a commencement of an event occurring at said event venue using a fixed camera located at said event venue, said target image containing a target location designated as a location for the insertion of a virtual graphic;
    designating a camera-pose of said target image to be an origin of a camera-pose space;
    obtaining at least one calibrated camera-pose image of said event venue, by:
        taking, immediately prior to said commencement of said event, an image of said event venue using said fixed camera, said image having a camera pose that differs from that of said target image;
        determining an augmentation homography of said calibrated camera pose image;
        determining a camera-pose location of said image using said augmentation homography, said camera-pose location being a position of said image in camera pose location; and,
        designating said image as a calibrated camera-pose image;
    obtaining a current image of said event venue during said event using said fixed camera;
    determining a current-to-calibrated homography of said current image to one of said calibrated camera-pose images having a camera-pose location closest to an estimated camera-pose location of said current image; and,
    calculating a camera-pose location of said current image using said current-to-calibrated homography and said augmentation homography of said calibrated camera-pose image;
    calculating a distance in camera-pose space between said current image and said one of said camera-pose images; and,
    when said distance in camera-pose space is less than a predetermined threshold, designating said current image as a calibrated camera-pose image thereby enlarging said camera-pose map of said fixed camera at said event.

2. The method of claim 1, wherein, said estimated camera-pose location of said current image is a camera pose location of an immediately preceding current image.

3. The method of claim 1, wherein, distance in camera-pose space between said current image and said one of said calibrated camera-pose images is calculated using the equation:

$$D = \text{Sqrt}((P2-P1)2 + (Z2-Z1)2 + (T2-T1)2),$$

where D represents the distance, P2 represents the pan component of the current image in camera-pose space, P1 represents the pan component of the calibrated camera-pose image in camera-pose space, Z2 represents the zoom component of the current image in camera-pose space, Z1 represents the zoom component of the calibrated camera-pose image in camera-pose space, and, T2 represents the translation component of the current image in camera-pose space, and T1 represents the translation component of the calibrated camera-pose image in camera-pose space.

4. The method of claim 1, wherein, said homography of said current image to one of said calibrated camera-pose images is calculated using a direct linear transformation.

5. The method of claim 4, wherein, said direct linear transformation is solved using a singular value decomposition.

6. The method of claim 1, wherein, said predetermined threshold is 1/100 of a distance between a camera-pose image when the camera is panned to an extreme right pan position with medium zoom, and a camera-pose image when the camera is panned to an extreme left pan position with medium zoom.

7. A system of organically generating a camera-pose map, comprising:
- a digital video camera located at a fixed location at an event venue;
- a programmable digital computer functionally connected to said digital video camera;
- designating, by an operator, a target location, said target location being an area deemed suitable for augmenting with a virtual augmentation;
- obtaining, by said operator using said computer and said camera, a target image of said target location within said event venue immediately prior to a commencement of an event at said event venue;
- designating a camera-pose of said target image to be an origin of a camera-pose space;
- obtaining and calibrating, by said operator using said computer and said camera, at least one calibrated camera-pose image, said calibrated camera-pose image having a calculated camera-pose location in said camera-pose space and a calculated augmentation homography to said target image; and,
- said computer being programmed to automatically preform the functions of:
  - obtaining, during an event at said event venue, a current image of said event venue using said fixed camera;
  - determining a current-to-calibrated homography of said current image to one of said calibrated camera-pose images having a camera-pose location closest to an estimated camera-pose location of said current image;
  - calculating a camera-pose location of said current image using said current-to-calibrated homography and said augmentation homography of said calibrated camera pose image;
  - calculating a distance in camera-pose space between said current image and said one of said camera-pose images; and,
  - when said distance in camera-pose space is less than a predetermined threshold, designating said current image as a calibrated camera-pose image.

8. The system of claim 7, wherein, said estimated camera-pose location of said current image is a camera pose location of an immediately preceding current image.

9. The system of claim 7, wherein, distance in camera-pose space between said current image and said one of said camera-pose images is calculated using the equation:

$$D=\mathrm{Sqrt}((P2-P1)2+(Z2-Z1)_2+(T2-T1)2),$$

where D represents the distance, P2 represents the pan component of the current image in camera-pose space, P1 represents the pan component of the calibrated camera-pose image in camera pose space, Z2 represents the zoom component of the current image in camera-pose space, Z1 represents the zoom component of the calibrated camera-pose image in camera-pose space, T2 represents the translation component of the current image in camera-pose space, and T1 represents the translation component of the calibrated camera-pose image in camera-pose space.

10. The system of claim 7, wherein, said current-to-calibrated homography of said current image to one of said calibrated camera-pose images is calculated using a direct linear transformation.

11. The system of claim 10, wherein, said direct linear transformation is solved using a singular value decomposition.

12. The system of claim 7, wherein, said predetermined threshold is 1/100 of a distance between a camera-pose image when the camera is panned to an extreme right pan position with medium zoom, and a camera-pose image when the camera is panned to an extreme left pan position with medium zoom.

* * * * *